United States Patent [19]

Reusser et al.

[11] 4,288,496
[45] Sep. 8, 1981

[54] SILICONE POLYMER-BASED RELEASE COATING AGENTS HAVING ORGANIC TITANATES AS STABILIZERS AND TAPES

[75] Inventors: Robert E. Reusser; Brenton E. Jones, both of Bartlesville, Okla.

[73] Assignee: Phillips Petroleum Company, Bartlesville, Okla.

[21] Appl. No.: 3,824

[22] Filed: Jan. 16, 1979

[51] Int. Cl.³ .............................................. B32B 9/04
[52] U.S. Cl. .............................. 428/447; 260/33.6 SB; 260/37 SB; 428/40; 428/352; 428/521
[58] Field of Search ................. 428/40, 447, 352, 521, 428/539; 260/33.6 SB, 37 SB

[56] References Cited

U.S. PATENT DOCUMENTS 4,002,794 1/1977 Schwarcz .............................. 428/40
4,151,344 4/1979 Doss et al. .......................... 428/447

Primary Examiner—Bernard D. Pianalto

[57] ABSTRACT

Variable strength release coating compositions for use with adhesive tape or film comprise low release strength silicone-based polymers, a high release strength silicone-based polymer, a dihydroxyterminated polymer of a conjugated diene, an organotin or other metal catalyst, and an organo titanate.

15 Claims, No Drawings

SILICONE POLYMER-BASED RELEASE COATING AGENTS HAVING ORGANIC TITANATES AS STABILIZERS AND TAPES

This invention relates to a silicone-based composition. In one of its aspects, the invention relates to a silicone polymer-based release coating composition. In another of its aspects, the invention relates to the use of such composition as with an adhesive tape or film.

In one of its concepts, the invention provides a release coating composition, the release strength of which can be varied, comprising low release strength silicone-based polymers, a high release strength silicone-based polymer, a dihydroxyterminated polymer of a conjugated diene, an organotin or other metal catalyst, as herein described, and an organo titanate. In another of its concepts, the invention provides an adhesive tape or film coated with such a composition as herein described.

Release agents referred to as parting agents or abherents are solid or liquid films that reduce or prevent adhesion between two surfaces. Industrial fields in which release agents have attained great importance include metal castings and processing, food preparation and packaging, rubber and polymer processing, paper coating, the production of pressure-sensitive tapes, and glass fabrication. Some industries could not have developed without the availability of modern release agents. Improvement in the usefulness of these agents is needed.

As an example, the pressure sensitive tapes could not be unwound if the backing were not coated with a release agent. The amount of release force necessary is as widely varied as the types of application in which the release agents are to be used. Manufacturers desire to accomplish with flexibility varying release forces, especially upon customer demand, by merely changing concentrations of components of whatever formulation is being used rather than by adding additional or alternate ingredients which means changing types of feeds, providing storage containers for such additional materials, and possibly increasing human error in the extra handling.

Despite their recent origin, the silicones represent the most important class of release agents. The commercially useful silicone-based, release agents are polymers. They have high boiling points and, therefore, a low volatility at room temperature; heat resistance, and resistance to oxidation. Also, silicones have low surface energy that reduces adhesion, increases chemical and physiological inertness and are generally colorless and nonstaining. Silicone resins, as distinguished from the release agents derived from them, are generally low molecular weight chemical intermediates that are further reacted or cured by heat and catalyst to give them their outstanding features as release agents.

The release coating compositions of the invention have been found to be possessed of a wide range of release force strength values which are available and by their improved stability prior to application as will appear more fully herein.

It is an object of the invention to provide a release coating composition. It is another object of the invention to provide a silicone-based release coating composition having variable release strength. It is a further object of the invention to provide such a composition wherein the ingredients or some of them can be varied to accomplish varying release force strengths of the final or total coating composition. It is another object of the invention to provide an adhesive tape or film which has been coated with a composition as herein described. It is a further object of the invention to provide release compositions which have good long-term storing or storage properties before application, especially good gelation stability.

Other objects, aspects, concepts and the several advantages of the invention are apparent from a study of this disclosure and the appended claims.

According to the present invention, there is provided a composition suitable for use as a release coating, as applied to a tape or film, which comprises essentially a mixture constituting low release strength silicone-based polymers, the mixture comprising a high weight average molecular weight polymethyldihydroxysiloxane and a low weight average molecular weight polymethylhydrosiloxane, a high release strength silicone-base polymer, a dihydroxyterminated polymer of a conjugated diene, an organotin or other metal catalyst, and an organotitanate.

According to the invention the amounts of high release strength silicone-base polymer and the dihydroxyterminated polymer of a conjugated diene can be varied to give varying release force strengths of the total or final coating composition.

Also, according to the present invention is provided a tape or film, or other object, coated with a composition according to the invention.

In its now preferred form the invention will comprise in addition to the ingredients already mentioned a solvent further described herein.

Essentially then, in its now preferred form, the invention comprises the following materials in composition: low release strength silicone-based polymers, high weight average molecular weight polymethyldihydroxysiloxanes, low weight average molecular weight polymethylhydrosiloxanes; high release strength silicone-based polymer; hydroxy terminated polyconjugated diene polymer; tetraalkyl titanate; catalyst; solvent.

A. Low Release Strength Silicone-Based Polymers

The low release strength silicone-based polymer useful in this invention is comprised of a mixture of a high weight average molecular weight polymethyldihydroxysiloxane and a low weight average molecular weight polymethylhydroxysiloxane generally in the range of about 97 weight percent of the high molecular weight ingredient and about 3 weight percent of the low molecular weight ingredient but operable in the range of 90–99 weight percent of the high molecular weight ingredient and 10–1 weight percent of the low molecular weight ingredient.

1. High Wt. Average Molecular Weight Polymethyldihydroxysilanes

The polymethyldihydroxysiloxanes useful in this invention are substantially linear dimethylsiloxane polymers in which the terminal silicon atoms of the polymer molecule have directly attached thereto hydroxy radicals. Such polymers are generally represented by the general formula

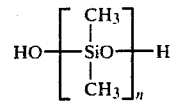

wherein n represents the number of repeating units in the polymer chain and is generally in the range of 1,000 to 5,000. Thus, the polymer molecules generally contain an average of about two hydroxyl groups per molecule located at or near the termini.

2. Low Wt. Average Molecular Weight Polymethylhydrosiloxanes

The polymethylhydrosiloxanes useful in this invention are substantially linear siloxane polymers in which some of the silicon atoms have hydrogen atoms bonded thereto, the remaining valencies of the silicon atoms being satisfied with methyl radicals or with oxygen atoms forming the —OSiOSiOSi— linkages within the siloxane chain. Thus, the operable polymethylhydrosiloxanes are represented by the general formula

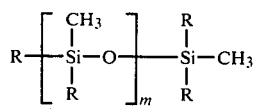

wherein R is hydrogen or a methyl radical, m refers to the number of repeating units in the polymer chain and is generally in the range of 25 to 100, with the further proviso that at least 25 percent of the R groups are hydrogen and preferably from 50 to 100 percent of the R groups are hydrogen with the remaining thereof being methyl radicals.

B. High Release Strength Silicone-Based Polymer

The silicone-derived polymers also referred to as silicates and useful in this invention are obtained by hydrolysis and trimethylsilylation of alkali metal silicates or tetraalkyl silicates.

A preferred method of preparation of the silicone-derived polymer involves the hydrolysis of sodium silicate with aqueous acid, for example, hydrochloric acid, and subsequent treatment of the hydrolyzed silicate with trimethylchlorosilane to give a hydrophobic polymer which generally contains less than 2 weight percent hydroxyl groups based upon the total weight of the trimethylsilylated polymer.

An alternative means of preparing the silicone-derived polymer involves the co-hydrolysis of trimethylchlorosilane and a tetraalkyl silicate of formula (R'O)$_4$Si wherein the R's are independently selected from alkyl radicals of 1-6 carbon atoms per radical. When co-hydrolyzing trimethylchlorosilane with a tetraalkyl silicate, it is necessary to add a small amount of an acid such as hydrochloric acid to effect hydrolysis and intercondensation or co-condensation. The amount of trimethylchlorosilane employed in the co-hydrolysis will vary from substantially less than the stoichiometric amount to slightly less than the stoichiometric amount depending upon the amount of hydroxyl groups desired in the resultant polymer.

The co-hydrolysis of trimethylchlorosilane and tetraalkyl silicate is relatively simple and merely requires addition of the trimethylchlorosilane and tetraalkyl silicate to a suitable solvent, such as toluene, benzene, xylene, etc., and thereafter addition of the solution of the ingredients to a sufficient amount of aqueous acid to effect the desired hydrolysis and co-condensation. The amount of water employed for hydrolysis purposes is generally not critical and may be varied within wide ranges.

For the release coatings of the present inventions it is generally preferable to employ silicone-derived polymers in a wt. average molecular weight range of 3,000 to 10,000 and preferably 4,000 to 6,000.

C. Hydroxy Terminated Polymers

Hydroxy terminated polymers useful in this invention are generally liquid or semi-liquid polymers having molecular weights in the range of 1,000 to about 20,000 represented by the general formula

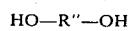

HO—R''—OH wherein R'' is derived from any conjugated diene such as 1,3-butadiene or isoprene. Generally these hydroxy terminated polymers are prepared by reacting an alkali metal such as lithium or sodium with an organic material containing at least one double bond such as naphthalene to give a dilithionaphthalene initiator. A conjugated diene such as butadiene or isoprene is then polymerized in the presence of the initiator followed by the addition of an alkylene oxide or oxygen and acid hydrolysis to the diol. The preparation of these type materials is generally described in U.S. Pat. Nos. 3,175,997; 3,108,994; 3,135,716; and 3,157,604. The products are generally clear to amber colored and can have 5 to 50% preferably 15 to 30% vinyl unsaturation.

D. Tetraalkyl Titanates

The tetraalkyl titanates generally useful in the release coatings of the present invention are those generally corresponding to the formula

(R'''O)$_4$Ti wherein the R''' groups can be the same or different and are generally alkyl radicals containing from 1 to 12 and preferably 1 to 4 carbon atoms per group. Examples of suitable tetraalkyl titanates include tetramethyl titanate, tetraethyl titanate, tetraisopropyl titanate (TIPT), tetra-n-butyl-titanate, tetraoctyl titanate, tetradecyl titanate, tetradodecyl titanate, and the like.

E. Catalysts

The catalysts useful in the preparation of the inventive release coatings are generally metal salts of carboxylic acids. Examples of metals which may be used are lead, tin, nickel, cobalt, iron, cadmium, chromium, zinc, and the like. The tin salts are generally preferred. Examples of suitable catalysts are dibutyltin diacetate, dibutyltin dilaurate, dibutyltin di-(2-ethylhexanoate), dioctyltin diacetate, tributyltin acetate, dioctyltin maleate, cobalt naphthenate, chromium octanoate, and the like. Dibutyltin diacetate is a preferred catalyst for the inventive release coating.

F. Solvent

Various organic solvents may be utilized as the liquid medium for applying the inventive release coatings to the desired substrates. Examples of these solvents are aliphatic hydrocarbons such as pentane, neopentane, hexane, octane; cycloaliphatic hydrocarbons such as cyclohexane, cycloheptane; aromatic hydrocarbons such as toluene, benzene, xylene; ethers such as diethyl ether, dibutyl ether, diamyl ether; and halogenated hydrocarbons such as carbon tetrachloride, chloroform, and dichloromethane. Such solvents can be employed either alone or in any suitable combinations thereof.

G. Release Coating Formulation

The release coatings of this invention to be applied to the desired substrates are generally formulated according to the proportions given in the recipe below and can be combined in any manner or order sufficient to homogenize the blend.

| Recipe | | |
|---|---|---|
| | Parts by Wt. | |
| Ingredients | Broad | Preferred |
| 1. Low Release Strength Silicone-Based Polymers | | |
|    a. High wt. av. mol. wt. Polymethyldihydroxysiloxanes | 3 | 3 |
|    b. Low wt. av. mol. wt. Polymethylhydrosiloxanes | 0.03–0.3 | 0.06–0.15 |
| 2. High Release Strength Silicone-Based Polymer | 0.1–0.5 | 0.2–0.3 |
| 3. Hydroxy Terminated Poly (conjugated Diene) Polymer | 0.01–0.25 | 0.03–0.15 |
| 4. Tetraalkyl Titanate | 0.005–0.5 | 0.01–0.1 |
| 5. Catalyst | 0.1–0.6 | 0.2–0.5 |
| 6. Solvent | 20–200 | 50–80 |

In the above recipe an important feature is the weight ratio of the high release strength silicone-base polymer (ingredient 2) to hydroxyterminated polymer (ingredient 3). Satisfactory operability is obtained in the present invention by employing the ratios shown below.

| | Wt. Ratio of High Release Strength Silicone-Based Polymer/Hydroxy-Terminated Polymer |
|---|---|
| Broad Range | 2/1 to 10/1 |
| Preferred Range | 3/1 to 6/1 |

H. Substrates

The compositions of this invention are particularly useful as release coatings for paper and other sheet materials. Examples of suitable substrates include glassine, vegetable parchment, kraft paper, metal foils, plastic films such as cellophane, polyethylene, polypropylene, vinyl resins, acrylic resins, polyamide resins, and polyester resins. A preferred substrate is corona-treated polyethylene-coated paper.

I. Adhesive

While the release coatings according to this invention applied to the above-described substrates prevent the sticking of practically any sticky material such as tar, asphalt, raw rubber, and the like, this invention is particularly suitable for use with pressure sensitive adhesives such as those based upon natural or synthetic rubbers including styrene-butadiene rubber, ethylene-vinyl acetate copolymers, polyacrylates, and the like.

J. Application

The coating compositions of this invention can be applied to suitable substrates by any conventional coating method. Such methods include spraying, brushing, rolling, and the like.

The amount of coating composition (excluding solvent) applied to paper or other sheet materials is usually in the range from 0.1 to 1 pound (45 to 454 gms) per ream of paper (3,000 ft.$^2$ or 280 m$^2$) coated on one side. It is within the scope of this invention, if desired, to coat the substrates on both sides with the inventive coating.

The coating formulations of this invention after being applied to suitable substrates are cured by evaporating the solvent and subjecting the coated substrate to a temperature of 65° C. to 125° C. for a period of time generally less than 1 minute. Of course, the substrate will frequently dictate the temperature employed with plastic films in order to prevent melting the films.

EXAMPLE

The following inventive and comparative runs demonstrate the preparation of the release paper for potential use with adhesive tape. Release coatings were applied to corona discharge-treated polyethylene-coated paper to give the desired release paper.

The inventive and comparative release coatings were based upon a commercially available mixture of 97 weight percent high molecular weight polymethyldihydroxysiloxane and 3 weight percent low molecular weight polymethylhydrosiloxane referred herein as low release strength silicone-based polymer (Syl-Off 23 from Dow Corning Corp.—solution containing 30% solids); a commercially available catalyst, dibutyltin diacetate (Syl-Off 23A from Dow Corning Corp.); a low molecular weight silicone-derived polymer referred herein as high release strength silicone-based polymer (C4-2109 from Dow Corning Corp.—solution containing 10% solids); a poly(butadiene)diol having a wt. average molecular weight of 5,000, a viscosity of 80 poise at 25° C. and a 25–26% vinyl unsaturation (Butarez HT from Phillips Petroleum Co.); and a tetraalkyl titanate (TIPT-tetrisopropyltitanate from Du Pont). Several comparative runs were made without TIPT.

The coatings were prepared by dissolving the desired ingredients (except catalyst) in n-octane solvent. Catalyst was added just prior to application. The solution (5–10 ml) was evenly distributed over a 22 cm×28 cm piece of corona-treated polyethylene-coated paper to provide an application rate of about 90 gms per ream (280 m$^2$) of paper. The coated sheets were dried in air at 88° C. for 30 seconds, then allowed to stand 24 hours in air at ambient room temperature prior to testing.

Properties of the release coatings were measured in accordance with procedure RC-283 of the Technical Association of the Pulp and Paper Industry (TAPPI). "Release Force" is defined as the ease (gms/inch of width) with which an adhesive tape is pulled from the coated surface. "Subsequent Adhesion" is defined as the ease (gms/inch of width) with which an adhesive tape is pulled from a metal panel when the adhesive tape was previously contacted with the release coating and, hence, is affected by transfer of the release coating from the paper to the adhesive upon separation thereof. "Subsequent Adhesion" is to be compared with ease of removal from a metal panel of the same adhesive tape which has not contacted the release coating.

In Table I are given the proportions of ingredients and test results for coatings based on 10 parts Syl-Off 23 (herein referred to as low release strength silicone-based polymer); 0.4 parts by weight Syl-Off 23A catalyst (dibutyltin diacetate); varying amounts of C4-2109 (herein referred to as high release strength silicone-based polymer); and various stabilizers. Zonas Surgical Tape (Johnson & Johnson) was employed. The data shows the results of various unsuccessful attempts (Runs 3, 4, 5) to stabilize a standard coating formulation (Runs 1 and 2). None of the coating compositions discussed above were stable towards gelation which means that if they are used commercially they must be used immediately after preparing and cannot be stored for any extended length of time (e.g., over the week-end), a definite disadvantage. The use of a poly(butadiene)diol (Run 5) greatly improved the release force strength, however, the gelation time was not improved.

In Table II are given the proportions of ingredients and test results of the inventive coating compositions based on 10 parts by weight Syl-Off 23, 0.4 parts by weight Syl-Off 23A, varying amounts of C4-2109 and Butarez HT which were kept in a near 5/1 weight ratio respectively; and 0.1 parts by weight TIPT (tetraisopropyl titanate).

TABLE I

Control Runs Without Tetraalkyl Titanate Stabilizer

| Components | Parts by Weight | | | | |
|---|---|---|---|---|---|
| | 1 | 2 | 3 | 4 | 5 |
| Lab Run No: | | | | | |
| 1. Syl-Off 23[a] | 10.0 | 10.0 | 10.0 | 10.0 | 10.0 |
| 2. Syl-Off 23A[b] | 0.4 | 0.4 | 0.4 | 0.4 | 0.4 |
| 3. n-Octane | 61.2 | 57.0 | 57.0 | 57.0 | 83.0 |
| 4. C4-2109[c] | 5.0 | 2.5 | 2.5 | 2.5 | 5.0 |
| 5. p-Cresol | — | — | 1.0 | — | — |
| 6. Phenol | — | — | — | 1.0 | — |
| 7. Butarez HT[d] | — | — | — | — | 1.0 |
| Performance: | | | | | |
| 1. Adhesion Control[e], gms/in. | 557 | 560 | 560 | 560 | 647 |
| 2. Release Force, gms/in. | | | | | |
| a. Unrubbed | 67 | 51 | 31 | 38 | 473 |
| b. Rubbed[f] | 125 | 120 | 71 | 54 | 540 |
| c. % Change | 86 | 135 | 129 | 42 | 14 |
| 3. Subsequent Adhesion, gms/in. | 603 | 543 | 457 | 467 | 473 |
| 4. Gelation, hrs. | <24 | <40 | <24 | <24 | <24 |

[a]Low release strength silicone-based polymer (Dow Corning Corp.).
[b]Catalyst, dibutyltin diacetate (Dow Corning Corp.).
[c]High release strength silicone-based polymer (Dow Corning Corp.), prepared by trimethylsilylating a hydrolyzed sodium silicate, Wt. Av. MW - 4,000–6,000. Hydroxy content is less than 0.5 weight percent on a solid basis.
[d]Poly(butadiene) diol, wt. av. MW 5,000, 25–26% vinyl unsaturation, Phillips Petroleum Co.
[e]Adhesion of tape to steel panel in gms/in.
[f]Rubbed lightly 20 times with paper household tissue prior to release force test to simulate handling.

The data shows good gelation stability when TIPT is present in the coating formulation regardless of the concentration of C4-2109/Butarez HT combination and allows for release strength values from 19 to about 300 without reduction in gelation time.

TABLE II

Inventive Runs with Tetraalkyl Titanate

| Components | Parts by Weight | | | | | |
|---|---|---|---|---|---|---|
| | 6 | 7 | 8 | 9 | 10 | 11 |
| Lab Run No: | | | | | | |
| 1. Syl-Off 23[a] | 10.0 | 10.0 | 10.0 | 10.0 | 10.0 | 10.0 |
| 2. Syl-Off 23A[b] | 0.4 | 0.4 | 0.4 | 0.4 | 0.4 | 0.4 |
| 3. n-Octane | 61 | 66 | 71 | 76 | 83 | 57.0 |
| 4. C4-2109[c] | 1.0 | 2.0 | 3.0 | 4.0 | 5.0 | 2.5 |
| 5. TIPT[d] | 0.1 | 0.1 | 0.1 | 0.1 | 0.1 | 0.1 |
| 6. Butarez[e] HT | 0.2 | 0.4 | 0.6 | 0.8 | 1.0 | — |
| Performance: | | | | | | |
| 1. Adhesion Control[f] gms/in. | 508 | 508 | 508 | 508 | 508 | 560 |
| 2. Release Force, gms/in. | | | | | | |
| a. Unrubbed | 19 | 58 | 243 | 253 | 293 | 235 |
| b. Rubbed[g] | 115 | 308 | 587 | 583 | 410 | 235 |
| c. % Change | 505 | 431 | 141 | 130 | 40 | 0 |
| 3. Subsequent Adhesion, gms/in. | 567 | 473 | 410 | 333 | 447 | 437 |
| 4. Gelation, hrs. | 113 | 113 | 113 | 113 | 113 | 113 |

[a]Refer footnotes, Table I.
[b]Refer footnotes, Table I.
[c]Refer footnotes, Table I.
[d]Tetraisopropyl Titanate from E. I. du Pont.
[e]Poly(butadiene) diol, wt. av. MW 5,000, 25–26% vinyl unsaturation, from Phillips Petroleum Co.
[f]Refer footnote e, Table I.
[g]Refer footnote f, Table I.

In Table III is given a summary of some of the data wherefrom it can be seen the effects of TIPT on gelation stability. Runs 2 and 5 exhibit poor gelation stability in the absence of TIPT whereas Runs 10 and 11 illustrate the good gelation stability in the presence of TIPT. Thus, in Table I, Runs 2 and 5 had less than 40 and 24 hours stability while in Table II Runs 10 and 11 had in excess of 113 hours. In addition, Run 5 in Table I, shows the extra adhesion available by the incorporation of a poly(butadiene)diol, Butarez HT.

TABLE III

Summary of Data

| Components | Parts by Weight | | | |
|---|---|---|---|---|
| | 2 | 11 | 5 | 10 |
| Lab. Run. No. | | | | |
| Syl-Off 23[a] | 10.0 | 10.0 | 10.0 | 10.0 |
| Syl-Off 23A[b] | 0.4 | 0.4 | 0.4 | 0.4 |
| n-Octane | 57.0 | 57.0 | 83.0 | 83 |
| C4-2109[c] | 2.5 | 2.5 | 5.0 | 5.0 |
| TIPT[d] | — | 0.1 | — | 0.1 |
| Butarez[e] HT | — | — | 1.0 | 1.0 |
| Performance: | | | | |
| 1. Adhesion Control[f], gms/in. | 560 | 560 | 647 | 508 |
| 2. Release Force, gms/in. | | | | |
| a. Unrubbed | 51 | 235 | 473 | 293 |
| b. Rubbed[g] | 120 | 235 | 540 | 410 |
| c. % Change | 135 | 0 | 14 | 40 |
| 3. Subsequent Adhesion, gms/in. | 543 | 437 | 437 | 447 |
| 4. Gelation, hrs. | <40 | >113 | <24 | >113 |

[a]See footnote a, Table I.
[b]See footnote b, Table I.
[c]See footnote c, Table I.
[d]See footnote d, Table II.
[e]Poly(butadiene) diol, MW 5,000, 25–26 vinyl unsaturation, from Phillips Petroleum Co.
[f]See footnote e, Table I.
[g]See footnote f, Table I.

Reasonable variation and modification of the scope of the foregoing disclosure and claims to the invention the essence of which is that there has been set forth a release coating applicable for use with adhesive coated tape or film, the composition essentially containing a low release strength silicone-based polymers containing mixture, a high release strength silicone-based polymer, a dihydroxyterminated polymer of a conjugated diene, an organometal catalyst, e.g., organotin or other metal catalyst, e.g., dibutyltin diacetate, and an organotitanate, e.g., tetraisopropyltitanate, wherein varying in the composition the ratio of the high release strength silicone-based polymer to the hydroxy-terminated polymer varies the release force strengths of the total or final coating composition, as applied, and can be readily obtained.

I claim:

1. A coating composition suitable for use with an adhesive tape or film which comprises the following ingredients in parts by weight as follows:

low release strength silicone-based polymers
  a. high wt. average molecular weight polymethyldihydroxysiloxanes, 3
  b. low wt. average molecular weight polymethylhydrosiloxanes, 0.03–0.3
high release strength silicone-based polymer, 0.1–0.5
hydroxy terminated poly(conjugated diene)polymer, 0.01–0.25
organo titanate, 0.005–0.5
catalyst, 0.1–0.6
solvent, 20–200

2. A coating composition according to claim 1 wherein the ingredients of the composition are present in parts by weight as follows:
low release strength silicone-based polymers
  a. high wt average molecular weight polymethyldihydroxysiloxanes, 3
  b. low wt average molecular weight polymethylhydrosiloxanes, 0.06–0.15
high release strength silicone-based polymer, 0.2–0.3
hydroxy terminated poly (conjugated diene) polymer, 0.03–0.15
tetraalkyl titanate, 0.01–0.1
catalyst, 0.2–0.5
solvent, 50–80

3. A composition according to claim 2 wherein the weight ratio high release strength silicone-based polymer to hydroxy-terminated polymer is in the range of 3/1 to 6/1.

4. A tape or film having thereon to prevent permanent sticking of an adhesive thereto a composition according to claim 3 from which the solvent had been removed.

5. A tape or film having thereon to prevent permanent sticking of an adhesive thereto a composition according to claim 2 from which the solvent had been removed.

6. A composition according to claim 1 wherein the weight ratio of high release strength silicone-based polymer to hydroxy-terminated polymer is in the range of 2/1 to 10/1.

7. A tape or film having thereon to prevent permanent sticking of an adhesive thereto a composition according to claim 1 from which the solvent had been removed.

8. A tape or film having thereon to prevent permanent sticking of an adhesive thereto a composition according to claim 1 from which the solvent had been removed.

9. A composition according to claim 3 wherein the low release strength silicone-based polymer comprises a mixture of high wt. average molecular weight polymethyldihydroxysiloxane and a low wt. average molecular weight polymethylhydrosiloxane in the approximate range of from about 90 to about 99 wt % of the former and from about 10 to about 1 wt % of the latter, polymethyldihydroxysiloxane being substantial linear dimethylsiloxane polymers in which the terminal silicon atoms of the polymer molecule have directly attached thereto hydroxy radicals and are represented by the general formula

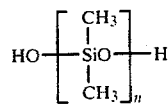

wherein n represents a number of repeating units of polymer chain and is in the approximate range of from about 1,000 to about 5,000, the polymethylhydrosiloxanes are substantial linear siloxane polymers in which some silicon atoms have hydrogen atoms bonded thereto, remaining valencies of the silicon atoms being satisfied with methyl radicals or with oxygen atoms forming the —OSiOSiOSi— linkages within the siloxane chain and are represented by the formula

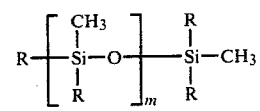

wherein R is hydrogen or a methyl radical, m refers to the number of repeating units in the polymer chain and is in the approximate range of from about 25 to 100, the high release strength silicone-based polymer is obtained by hydrolysis and trimethylsilylation of alkali metal silicates ot tetraalkyl silicates and has a weight average molecular weight range of from about 3,000 to about 10,000, and wherein the hydroxy terminated polymers are liquid or semi-liquid and have molecular weights in the range of from about 1,000 to about 20,000 and are represented by the general formula

HO—R''—OH wherein R'' is derived from a conjugated diene.

10. A composition according to claim 9 wherein the conjugated diene is selected from 1,3-butadiene and isoprene.

11. A composition according to claim 9 wherein the catalyst is a metal salt of a carboxylic acid.

12. A composition according to claim 11 wherein the metal is at least one selected from lead, tin, nickel, cobalt, iron, cadmium, chromium, and zinc.

13. A composition according to claim 11 wherein the catalyst is a tin salt and is at least one selected from dibutyltin diacetate, dibutyltin dilaurate, dibutyltin di-(2-ethylhexanoate), dioctyltin diacetate, tributyltin acetate, dioctyltin maleate, cobalt naphthenate, and chromium octanoate.

14. A composition according to claim 11 wherein the catalyst is dibutyltin diacetate.

15. A composition according to claim 14 wherein the organo titanate is represented by the general formula (R'''O)$_4$Ti wherein the R''' groups can be the same or different and are generally alkyl radicals containing from 1 to 12 and preferably 1 to 4 carbon atoms per group.

* * * * *